United States Patent
Berger

(10) Patent No.: US 6,413,430 B1
(45) Date of Patent: Jul. 2, 2002

(54) METHOD AND DEVICE FOR DEMULSIFYING AN OIL-CONTAINING AQUEOUS EMULSION

(75) Inventor: Thomas Berger, Essen (DE)

(73) Assignee: Messer Griesheim GmbH (DE)

(*) Notice: Subject to any disclaimer, the term of this patent is extended or adjusted under 35 U.S.C. 154(b) by 0 days.

(21) Appl. No.: 09/555,437
(22) PCT Filed: Nov. 26, 1998
(86) PCT No.: PCT/EP98/07639
§ 371 (c)(1), (2), (4) Date: May 30, 2000
(87) PCT Pub. No.: WO99/29390
PCT Pub. Date: Jun. 17, 1999

(30) Foreign Application Priority Data

Dec. 10, 1997 (DE) .......................... 197 54 756

(51) Int. Cl.⁷ ............................. B01D 61/16; C02F 1/24
(52) U.S. Cl. ................. 210/638; 210/650; 210/703; 210/708; 210/774; 210/805; 210/808; 516/141
(58) Field of Search ............................. 210/708, 737, 210/712, 639, 650, 651, 800, 804, 638, 703, 706, 774, 805, 806, 808; 516/141, 142, 194; 208/187, 188

(56) References Cited

U.S. PATENT DOCUMENTS 3,917,526 A * 11/1975 Jennings
4,222,871 A * 9/1980 Lefeuvre .................... 210/650
5,066,386 A * 11/1991 Paspek et al.
5,435,920 A * 7/1995 Penth

FOREIGN PATENT DOCUMENTS

WO 93/11846 * 6/1993

OTHER PUBLICATIONS

Scott, Keith. Handbook of Industrial Membranes, 1st edition. Jul. 1996. Elsevier Advanced Technology. pp. 103–105.*

* cited by examiner

Primary Examiner—Joseph W. Drodge
(74) Attorney, Agent, or Firm—Connolly Bove Lodge & Hutz LLP

(57) ABSTRACT

A process for separation of an oil-containing aqueous emulsion includes mixing the oil-containing aqueous emulsion with carbon-dioxide and subjecting the emulsion and carbon dioxide for a specified time within an autoclave to an elevated pressure and an elevated temperature. A rising stream of bubbles is formed within the autoclave by suddenly relieving the pressure within the autoclave with the rising stream of bubbles serving to separate the oil-containing aqueous emulsion into an oil-rich phase and an oil-depleted emulsion. The oil depleted emulsion is transferred to a segrating tank. At least a fraction of the oil-depleted emulsion within the segregated tank is subjected to ultrafiltration to separate the fraction into a permeate and a retentate.

14 Claims, 1 Drawing Sheet

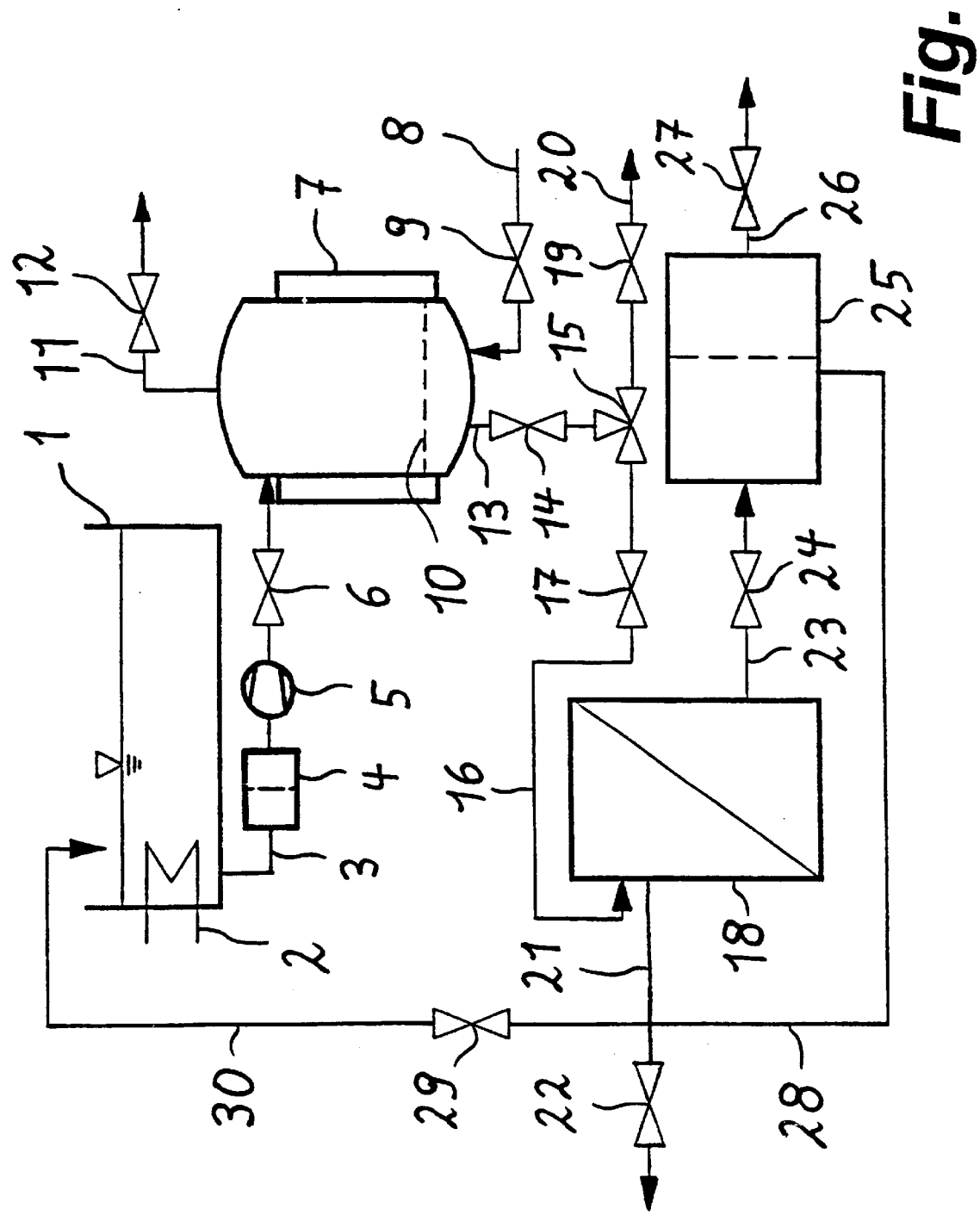

METHOD AND DEVICE FOR DEMULSIFYING AN OIL-CONTAINING AQUEOUS EMULSION

BACKGROUND OF THE INVENTION

The invention relates to a process and to a device for the separation of an aqueous emulsion containing oil.

A large amount of cooling lubricants and wash water are produced in the metalworking industry. These aqueous emulsions containing oil are relatively stable. This is because the relatively severe conditions to which they are exposed place relatively great demands on them in terms of stability. Because of their relatively high oil content, these types of aqueous emulsions containing oil should not be discharged to the drains. They therefore require special treatment before they are disposed of.

Known processes for the separation of emulsions include chemical processes, for example column separation, thermal processes, for example evaporation and combustion, as well as electrochemical processes. Examples of mechanical and physical processes including centrifuging and adsorption.

Owing to the high stability of aqueous emulsions containing oil, relatively simple mechanical and physical segregation processes are unsuitable. Emulsion separation using acids followed by neutralization leads to a relatively heavy salt load in the waste water. Electrochemical processes produce large volumes of sludge which in turn need to be processed.

DE 40 28 904 C1 describes a process for emulsion separation in which carbon dioxide is used. In this process, an emulsion which, apart from auxiliaries, essentially comprises oil, water and also an anionic emulsifier or an emulsifier combination of anionic and non-ionic surfactants, is either saturated with carbon dioxide under pressure or mixed with water containing carbon dioxide and, by subsequent slow heating, is separated into an organic phase and an aqueous phase. The separated emulsion is then discharged into a tank, where the water phase and oil phase separate. The process is preferably combined with a membrane filtration.

The relatively mild oxygen treatment using carbon dioxide leads to aqueous fractions whose purity is often not yet high enough to allow discharge to the drains.

SUMMARY OF THE INVENTION

The object of the invention is therefore to provide a process and a device for the separation of relatively difficult to separate aqueous emulsions containing oil, with which the disadvantages of the prior art are overcome and which produce an aqueous fraction that meets relatively stringent requirements in terms of purity.

The object is achieved by a process in which the aqueous emulsion containing oil is subjected for a specified time to an elevated pressure and an elevated temperature, mixed with carbon dioxide and subsequently relieved. The oil-depleted emulsion preclarified in this way is subsequently segregated in a separating tank. The resultant aqueous fraction is then separated by ultrafiltration into a retentate and water. The separation is carried out in an autoclave. A rising stream of carbon dioxide bubbles is produced by sudden pressure relief and an oil-rich phase is removed by the rising stream of carbon dioxide bubbles.

The essential advantage of the process according to the invention consists in that, through sudden pressure relief of the solution that is saturated with carbon dioxide, simultaneous release of gas bubbles is brought about throughout the entire emulsion. In this case, the separated oil fractions are removed by the upward motion of the gas bubbles in a first preclarification step through relief flotation, which brings about a substantial acceleration of the phase segregation. With the subsequent ultrafiltration, the aqueous phase that has segregated is cleaned to an extent such that this aqueous phase is sure to meet the purity requirements for discharge to the drains.

The invention provides that the aqueous emulsion containing oil is subjected to a pressure of up to 80 bar and subsequently relieved to approximately atmospheric pressure. This has the advantage that a relatively large amount of carbon dioxide is dissolved in the emulsion and dissociated to form carbonic acid. This leads to a medium strength acid. The relatively large amount of carbon dioxide that is degassed leads to good flotation.

Preferably, the aqueous emulsion containing oil is subjected to a pressure of from 3 to 10 bar. This leads to the advantage that the outlay on equipment is relatively low, and so only relatively low production costs are incurred.

According to the invention, the aqueous emulsion containing oil is subjected to a temperature of from 20° C. to 60° C. Such a temperature is advantageous because the pH and therefore the acid separation are improved.

It is proposed according to the invention that the aqueous emulsion containing oil is kept at the elevated pressure and the elevated temperature for a period from 5 to 20 min. As a result, advantageously, the maximum possible equilibrium concentration (pH) is achieved and the carbon dioxide is utilized particularly effectively.

According to the invention, after the carbon dioxide has been added, the aqueous emulsion containing oil has a pH lying in the range of between pH 3 to pH 7. A pH between pH 3 and pH 7 is advantageous since a pH of less than 7 is needed to carry out acid separation. The limit for carbonic acid lies at a pH of 3.

According to the invention, the retentate is fed back to the autoclave through a storage container after the ultrafiltration. This procedure has the advantage that there is no need to dispose of concentrated oil/aqueous solution mixtures, as is customary with ultrafiltration.

The object is also achieved by a device for carrying out the process according to the invention, which has an autoclave, a separating tank and an ultrafiltration system, an injection device for injecting fine bubbles of carbon dioxide being arranged in the bottom region of the autoclave.

Preferably, the injection device has a sintered baseplate, a bed of balls or one or more fine-meshed screening bases. The term "fine-meshed screen bases" is in this case intended to mean screening bases with apertures of a diameter in a range from 0.1 to 1 mm. The sintered baseplate preferably has apertures of a diameter in a range from 0.01 to 0.5 mm. The diameter of the apertures in the bed of balls is preferably in a range from 0.5 to 1 mm. The use of the sintered baseplate has the advantage that it results in a relatively high degree of uniformity for the injection. The use of a bed of balls is advantageous since, in this case, there is scarcely any risk of blockage and/or the balls are easy to clean. Use of one or, in particular, more fine-meshed screening bases is advantageous since they are easy to take out in order to be cleaned or can easily be replaced.

BRIEF DESCRIPTION OF THE DRAWING

The process and device according to the invention are explained in more detail by way of example with reference to a drawing (FIGURE) and an illustrative embodiment.

The drawing (FIGURE) shows the device according to the invention for the separation of an aqueous emulsion containing oil.

DETAILED DESCRIPTION OF THE INVENTION

From a storage container 1, which may be thermally regulated using a heating element 2, the emulsion to be separated is fed via a line 3, a filter 4, a pump 5 and a valve 6 to the autoclave 7. The emulsion is saturated with carbon dioxide and the pressure in the autoclave 7 is increased by means of a carbon dioxide supply system consisting of a line 8 with a nonreturn valve 9 and a sintered baseplate 10 in the bottom region of the autoclave. The pressure is relieved via the line 11 with a valve 12 at the head end of the autoclave 7. The separated emulsion is let out at the bottom part of the autoclave 7 via a line 13 with a valve 14, the outlet ending in a three-way tap 15 from which the aqueous phase is fed via the line 16 and valve 17 to the separating tank 18. The oil phase is fed off via the valve 19 and through the line 20. The oil phase liberated during this separation in the separating tank 18 leaves the separating tank 18 through the line 21 with the valve 22, and can be fed to a disposal system. The aqueous fraction from the separating tank 18 is fed through the line 23 and the valve 24 to the ultrafiltration system 25. The clarified water leaves the ultrafiltration system 25 through the line 26 with the valve 27. The concentrated oil phase from the ultrafiltration system 25 is fed through the line 28, through the valve 29 and the line 30, to the storage container 1 for retreatment.

During operation of the device, the emulsion to be separated is present in the storage container 1. It may in this case already have been preheated using the heating element 2 in order to save on the heating time in the autoclave 7. Before it is fed into the autoclave 7, it passes through a filter 4, where particles can be retained, and a pump 5. In the autoclave 7, the temperature is regulated to up to 80° C., preferably 60° C. The pressure is increased using carbon dioxide through a feed at the bottom part of the autoclave 7. Advantageously, the carbon dioxide passes through a sintered baseplate 10. It is also effective to use a bed of balls or a stack of fine-meshed screening bases, which make it possible to inject the carbon dioxide over the entire cross section of the autoclave and, in addition, the break-up of the carbon dioxide in this unit directly leads to small carbon dioxide bubbles which, in relation to the quantity of gas put through, bring about a maximum surface area and therefore a maximum rate for the dissolving the carbon dioxide in the emulsion. Instead of the autoclave 7, it is also possible for a different container to be used, which meets the requirements in terms of pressure and temperature. A pressure up to 80 bar, preferably 60 bar, is set up by the introduction of the carbon dioxide. In this case, a pH of the emulsion is set up which lies below pH 7. In the acid range, the emulsifying action on the emulsion by the surfactants is canceled, so that it is even possible to separate emulsions which are stabilized very strongly by emulsifiers. After the required treatment time, the pressure is relieved rapidly by opening the outlet valve 12 in the upper region of the pressure vessel, and at the same time about 95% of the carbon dioxide is released through the entire liquid volume. This produces a rising stream of gas which vigorously entrains the oil phase upward through flotation, and therefore significantly accelerates the separation of the two phases. The emulsion preclarified in this way is separated, directly after the autoclave 7, into an aqueous fraction and an oil phase at the three-way tap 15. Through the preliminary thermal regulation of the emulsion in the storage container 1, and the delaying of the rest of the separation until the separating tank 18, the load on the autoclave 7 is reduced and the process thus becomes particularly economical. Both have the effect that the retention time in the autoclave 7 is shortened, and its service life for active separation with carbon dioxide is thereby increased. The preclarified aqueous fraction is fed through the line 16 to the separating tank 18, in which the further separation is carried out. By way of example, a mechanical separating tank which allows the oil phase to be let out is suitable for this. A so-called "skimmer" may for example advantageously be used, in which the oil phase is skimmed off at the surface. The aqueous phase is fed according to the invention through a line 23 to an ultrafiltration system 25 which delivers high-quality dischargeable water and a concentrated oil phase which can be fed back to the entire separating circuit for retreatment.

What is claimed is:

1. A process for the separation of an oil-containing aqueous emulsion comprising the steps of: 1) mixing the oil-containing aqueous emulsion with carbon dioxide and subjecting the oil-containing aqueous emulsion and the carbon dioxide for a specified time within a heatable pressure vessel to an elevated pressure and an elevated temperature; 2) forming a rising stream of bubbles within the heatable pressure vessel by suddenly relieving the pressure with the heatable pressure vessel over the entire liquid space, the rising stream of bubbles serving to separate the oil-containing aqueous emulsion into an oil-rich phase and an oil-depleted emulsion; 3) transferring the oil-depleted emulsion to a segregating tank; and 4) subjecting at least a fraction of the oil-depleted emulsion with the segregating tank to ultrafiltration to separate the fraction into a permeate and a retentate.

2. The process as claimed in claim 1, wherein the aqueous emulsion containing oil is subjected to a pressure of up to 80 bar and subsequently relieved to approximately atmospheric pressure.

3. The process as claimed in claim 2, wherein the aqueous emulsion containing oil is subjected to a pressure of from 3 to 10 bar.

4. The process as claimed in claim 3, wherein the aqueous emulsion containing oil is subjected to a temperature of from 20° C. to 60° C.

5. The process as claimed in claim 4, wherein the aqueous emulsion containing oil is kept at the elevated pressure and the elevated temperature for a period from 5 to 20 min.

6. The process as claimed in claim 5, wherein, after the carbon dioxide has been added, the aqueous emulsion containing oil has a pH lying in the range of between pH 3 to pH 7.

7. The process as claimed in claim 6, wherein the retentate is fed back to the autoclave through a storage container after the ultrafiltration.

8. The process as claimed in claim 1, wherein the aqueous emulsion containing oil is subjected to a pressure of from 3 to 10 bar.

9. The process as claimed in claim 1, wherein the aqueous emulsion containing oil is subjected to a temperature of from 20° C. to 60° C.

10. The process as claimed in claim 1, wherein the aqueous emulsion containing oil is kept at the elevated pressure and the elevated temperature for a period from 5 to 20 min.

11. The process as claimed in claim 1, wherein, after the carbon dioxide has been added, the aqueous emulsion containing oil has a pH lying in the range of between pH 3 to pH 7.

12. The process as claimed in claim 1, wherein the retentate is fed back to the pressure vessel through a storage container after the ultrafiltration.

13. A process for the separation of an oil-containing aqueous emulsion comprising the steps of: 1) mixing the oil-containing aqueous emulsion and the carbon dioxide for a specified time within an autoclave to an elevated pressure and an elevated temperature; 2) forming a rising stream of bubbles within the autoclave by suddenly relieving the pressure within the autoclave over the entire liquid space, the rising stream of bubbles serving to separate the oil-containing aqueous emulsion into an oil-rich phase and an oil-depleted emulsion; 3) transferring the oil-depleted emulsion to a segregating tank; and 4) subjecting at least a fraction of the oil-depleted emulsion within the segregating tank to ultrafiltration to separate the fraction into a permeate and a retentate.

14. The process as claimed in claim 13, wherein the aqueous emulsion containing oil is subjected to a pressure of from 3 to 10 bar.

\* \* \* \* \*